United States Patent Office 3,476,316
Patented Nov. 4, 1969

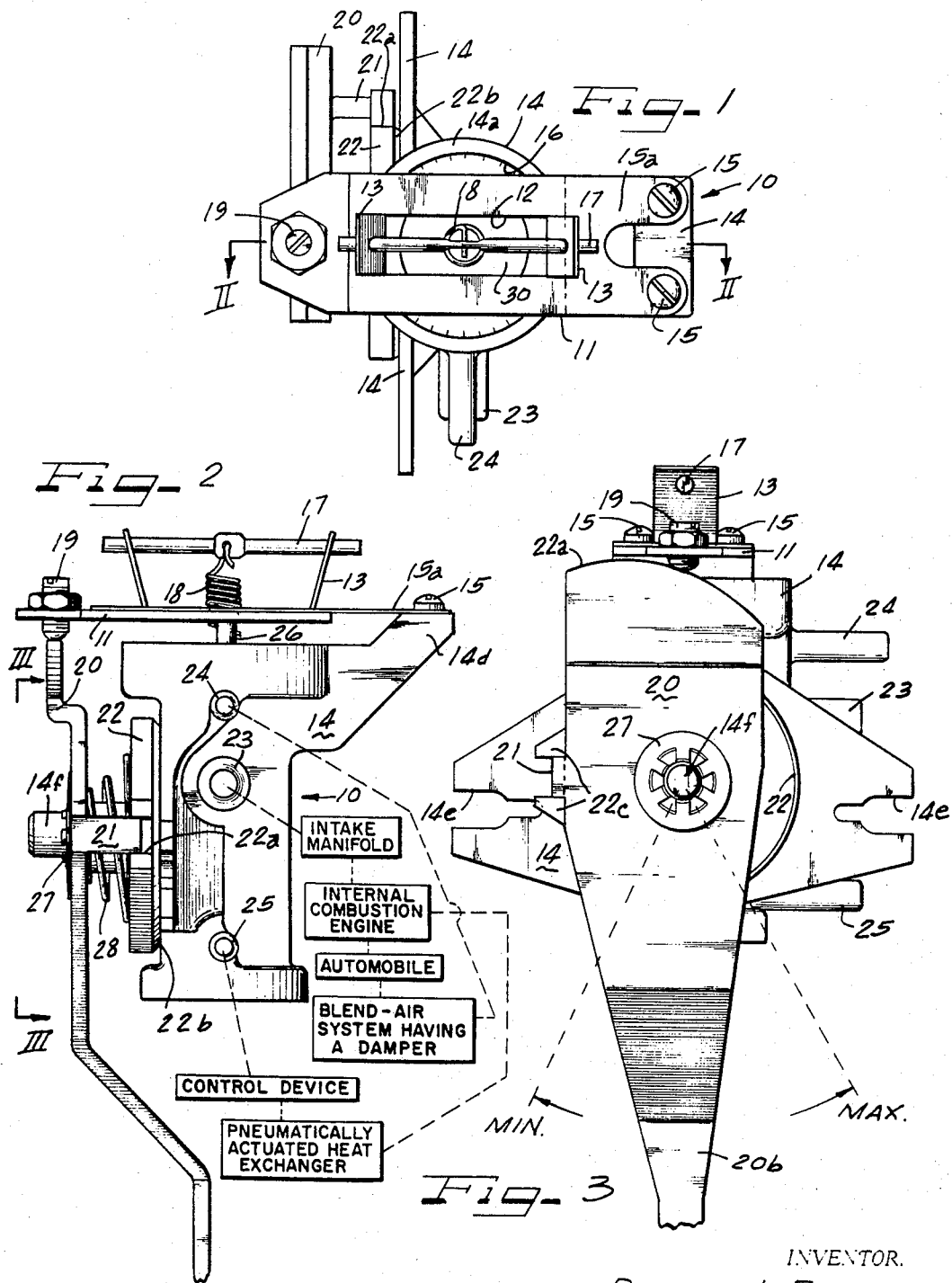

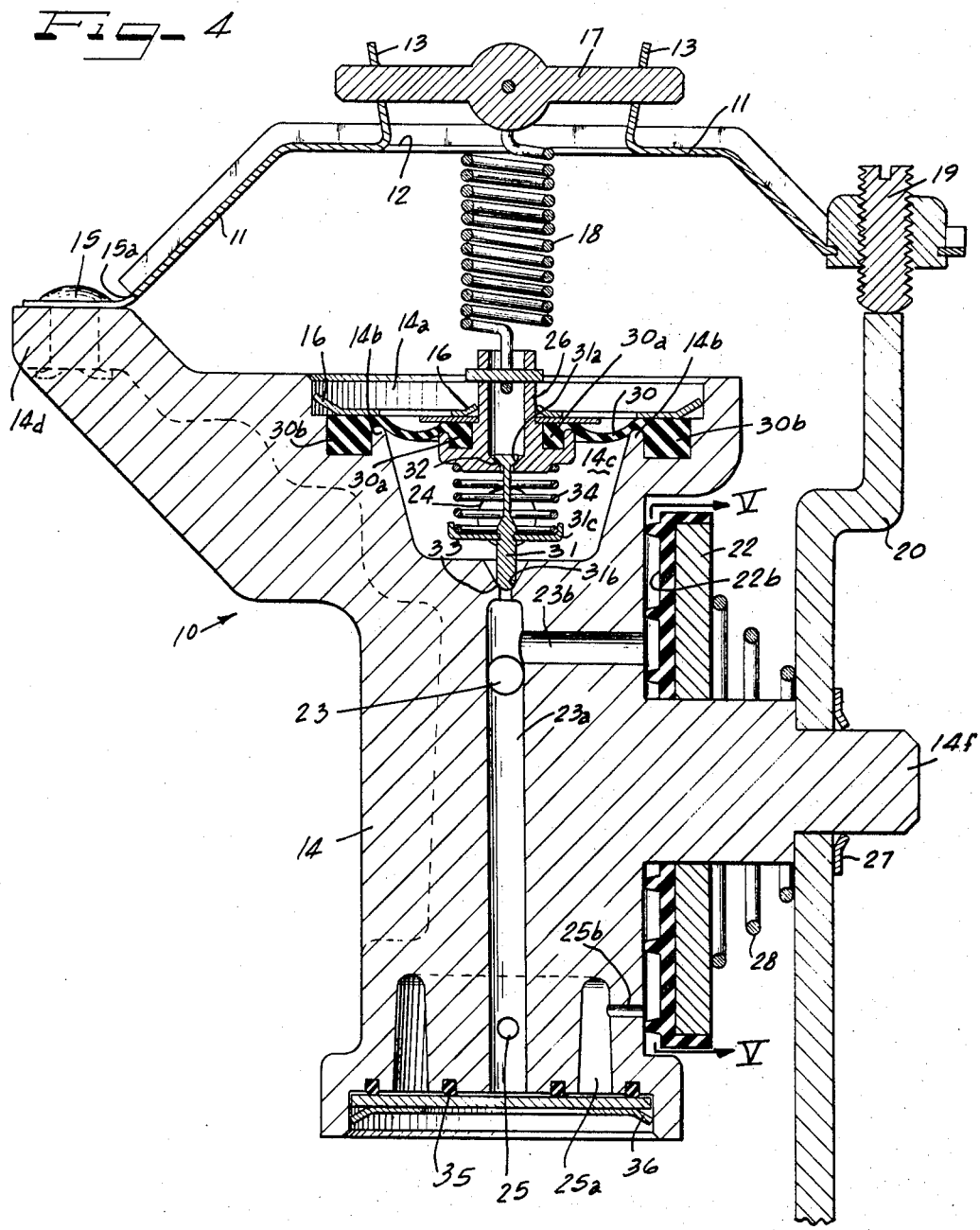

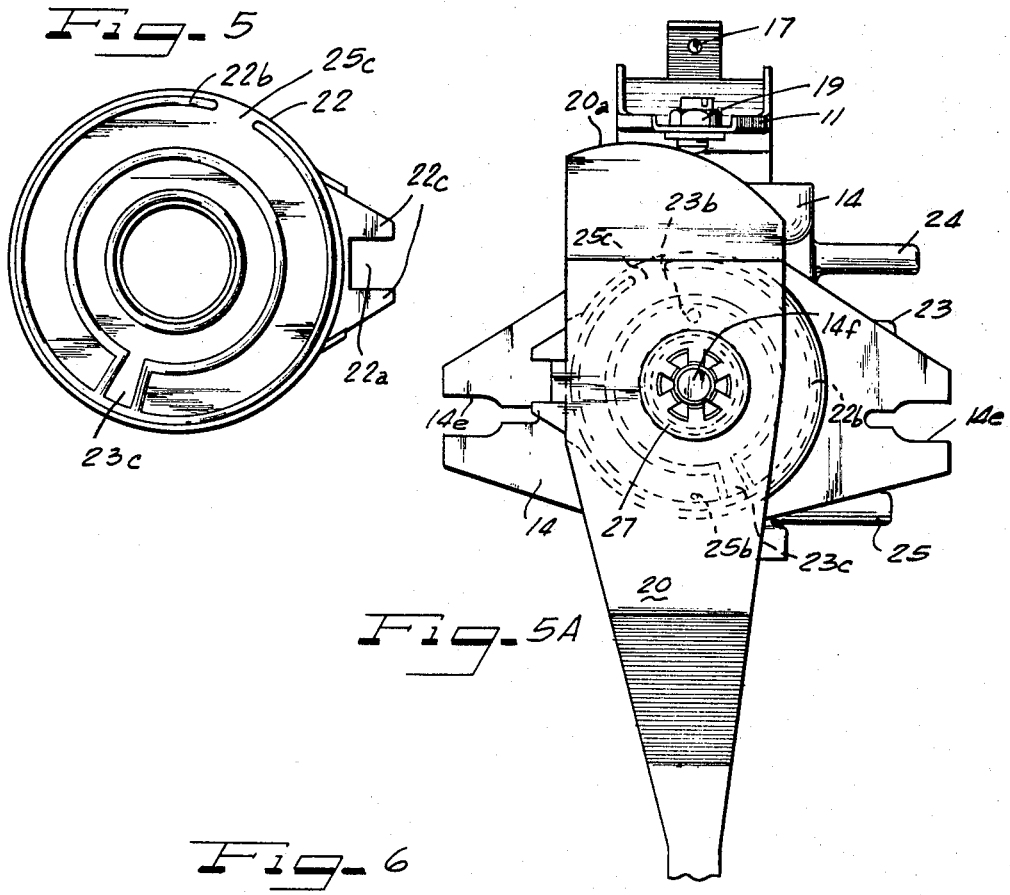
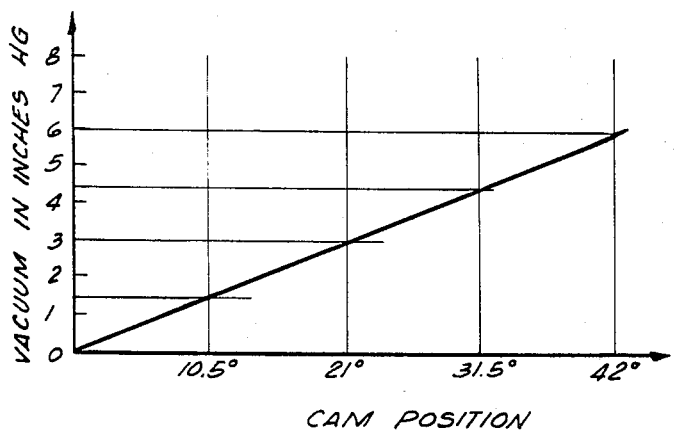

3,476,316
VACUUM REGULATOR
Rudolph J. Franz, Arlington Heights, Ill., assignor to The Dole Valve Company, Morton Grove, Ill., a corporation of Illinois
Filed Apr. 12, 1967, Ser. No. 630,297
Int. Cl. G05d 23/00; F15b 11/00, 13/00
U.S. Cl. 237—2                    14 Claims

ABSTRACT OF THE DISCLOSURE

A valve mechanism having a vacuum regulator modulating vacuum in reference to a mechanical force to actuate a vacuum motor for opening and closing doors to a blend-air system and having an on-off output switch regulating flow of heat exchange fluid through a heat exchange core.

FIELD OF THE INVENTION

This invention relates generally to vacuum regulators and more particularly to a vacuum valve mechanism for regulating vacuum in reference to a mechanical force.

SUMMARY OF THE INVENTION

The present invention is particularly suitable, though not limited, for use in controlling various air conditioning actuators within an automobile wherein the source of vacuum comprises a connection to the suction manifold of the engine. Automobiles are generally equipped with a forced air system which includes a blend-air system for maintaining the desired temperature within the automobile by circulating air across a heat exchanger, such as a heating or cooling coil and into the interior of the automobile.

According to the invention, a damper within the blend-air system is adjustable by means of modulated vacuum to an actuator connected thereto and substantially simultaneously the flow of heat exchange fluid within the heat exchange coil is also regulated by a variation of vacuum.

It is contemplated in this invention that the temperature in a conditioned space can be controlled by limiting the amount of conditioned air flowing from a heat exchanger thereto and by controlling the flow of heat exchange fluid through the heat exchanger. This control of air temperature can be accomplished by adjusting the flow of air into the space and by reducing the amount of fluid by-passing the heat exchanger.

The invention provides a vacuum operated servomechanism for controlling both the flow of air and flow of heat exchange fluid through the heat exchanger. It will be appreciated, however, that the servomechanism can also operate by a pressure as well as a vacuum condition in applications in which a positive rather than a negative source of air or other fluid is available.

The operation of the servomechanism is regulated by mechanical or manual means responsive to the temperature of the air within the conditioned space.

It is, therefore, an important object of the present invention to provide a temperature control system to regulate the temperature of a conditioned space comprising a blend-air system having adjustable damper means and a heat exchanger with a vacuum operated servomechanism for controlling the setting of the damper and the flow of heat exchange fluid within the heat exchanger.

It is another object of the invention to provide a valve control means simultaneously regulating the setting of an adjustable damper in a blend-air system and the flow of heat exchange fluid through a heat exchanger.

It is yet a further object of the invention to provide calibrated adustment means controlling the sensitivity of the novel valve mechanism.

Many other features, advantages and additional objects of the present invention will become more apparent to those versed in the art upon reference to the detailed description which follows, having accompanying sheets of drawings, in which preferred structural embodiments incorporating the principles of the present invention are shown by way of illustrative example only.

BRIEF DESCRIPTION OF THE DRAWINGS

FIGURE 1 is a top perspective view of the vacuum regulator constructed in accordance with the principles of the present invention;

FIGURE 2 is a vertical view of a vacuum regulator taken substantially along lines II—II of FIGURE 1;

FIGURE 3 is a side plan view of the vacuum regulator taken substantially along lines III—III of FIGURE 2 and illustrating in phantom the extreme operating position of the vacuum regulator;

FIGURE 4 is a vertical sectional view of a modified form of the vacuum regulator of the present invention with parts in elevation;

FIGURE 5 is a plan view taken substantially along lines V—V of FIGURE 4 showing a part of the vacuum regulator of the present invention;

FIGURE 5A is a partial side plan view somewhat similar to that shown in FIGURE 3 illustrating certain parts in phantom to show the relationship thereto in conjunction with the other parts of the vacuum regulator; and FIGURE 6 is a graph plotting the relationship between the amount of vacuum supplied to the vacuum regulator and the relative position of the vacuum regulator necessary to balance the vacuum force.

DESCRIPTION OF THE PREFERRED EMBODIMENTS

Although the principles of the present invention are of utility in any system for controlling the temperature of a conditioned space, a particularly useful application is made in a system for controlling the temperature of the passenger compartment of an automobile or similar vehicular structure.

In reference to the drawings, wherein like reference numerals refer to similar parts, a vacuum regulator, generally indicated at reference numeral 10, which incorporates the principles of the present invention, is mounted in an appropriate fashion within an engine compartment of an automobile. The vacuum regulator 10 is provided with suitable connecting means between a conventional suction manifold of an internal combustion engine (not shown), a conventional heat exchanger having pneumatic means regulating the flow of fluid therethrough (not shown) and pneumatic actuator means (not shown), such as the vacuum motor disclosed in my co-pending application U.S. Ser. No. 570,524, filed Aug. 5, 1966, now Patent 3,412,649 issued Nov. 26, 1968 which disclosure is incorporated herein by reference. The mounting and connections of the vacuum regulator 10 in relation to the various pneumatic devices is well understood in the art and need not be described in any greater detail.

Referring to FIGURE 1, wherein a top plan view of the vacuum regulator 10 is shown, having an elongated top plate 11, with a slot 12 in the approximate center thereof and having a pair of upwardly extending ears or tabs 13 at opposed peripheral edges of the slot 12. The top plate 11 is secured at one end thereof by fastening means 15 to the vacuum regulator body 14 so as to have a substantially frictionless pivot area 15a allowing pivotal movement between the top plate 11 and body 14. The main body 14 has a circular opening 14a leading into the body cavity which is enclosed with a flexible diaphragm as will become more apparent hereinafter. The diaphragm is secured within the circular opening 14a by appropriate means, such as a first spider means 16 pressure fitted within the opening 14a. The ear 13, which are tensioned for rate adjustment, are provided with apertures (not shown) to accommodate a bar member 17 positioned therebetween. The bar member 17 has suitable means, such as a central opening in its body for securing one end of a spring 18, the other end of which is secured to the flexible diaphragm 30.

The opposite end (from that fastened onto the body 14) of elongated top plate 11 is freely supported on adjustment means such as a set screw or calibration shaft 19, which rests on a cam lever 20. The calibration shaft 19 may be in the form of a threaded screw extending through the top plate 11 and having its outer end contacting the cam 20. The generally spoon-shaped cam 20 is arcuately movable in a plane perpendicular to plate 11 and has a top working surface engaging shaft 19 for moving the same in an up and down motion in response to the arcuate movement of the cam 20. A follower tab 21 may be suitably formed with, or rigidly attached to the cam body 20 for engagement with a diverter plate asembly 22. The diverter plate assembly 22 is provided with a slot 22a for receiving the follower tab 21 and thereby causing the diverter plate assembly 22 to move substantially simultaneously with the movement of the cam 20. The diverter plate assembly also has a sealing face 22b in sealable operating relationship with a planar portion of vacuum regulator body 14 interconnecting a plurality of chambers with the body 14.

A vacuum source nipple 23 communicates with the inner chamber of body 14 and extends from a side portion of body 14 for appropriate connection, as by flexible hose, to a vacuum source, such as the intake manifold of an internal combustion engine. In spaced relationship above vacuum source nipple 23 there is provided a first actuator connecting nipple 24 extending from the body 14 and communicating with the interior thereof. In spaced relationship below vacuum source nipple 23, a second actuator connecting nipple 25 (as best seen in FIGURE 2) is provided extending from body 14 and communicating with a separate interior chamber 25a from the chamber 23a (as seen in FIGURE 4), communicating with nipples 23 and 24, respectively. The relationship of the respective nipples to the interior chambers of body 14 will be explained in more detail in conjunction with FIGURE 4.

FIGURE 2 is a vertical view taken along lines II—II of FIGURE 1 and shows various parts in elevation. As previously pointed out, similar parts are referred to by like reference numerals. Vacuum regulator 10 has a generally cyclindrical body 14 with a somewhat elongated upper end having an extending lip 14d upon which is attached, by means of a fastener 15, an elongated top plate 11 having upwardly extending ears 13 at opposite peripheral edges of a center slot, similar to slot 12 discussed in conjunction with FIGURE 1. The ears 13 are adjustably tensioned to support a bar 17 therebetween, through which is attached one end of a spring 18, with the other end of the tensioning means 18 being attached to an upwardly extending hollow finger 26. The finger 26 is attached to a flexible diaphragm within the interior cavity of body 14 as will become more apparent from the discussion in conjunction with FIGURE 4. The other end of plate 11 has a calibrated shaft 19 extending therethrough to contact the working edge of cam lever 20. The cam 20 is provided with an opening (not shown) to accommodate a side projection 14f of the body 14. The cam is held on the side projection 14f by means of a second spider fastener 27. The cam 20 is arcuately movable about projection 14f, which acts as a pivot point. The cam 20 is provided with a follower tab 21 extending inwardly, from a side thereof, toward body 14 and may be aligned with the pivot mounting opening. Follower tab 21 engages slot 22a of the diverter plate 22 causing the diverter plate 22 to move with cam 20. The diverter plate is also provided with a sealing face 22b in operative relationship with a planar side portion of vacuum regulator body 14. Mounted concentrically on side projection 14f is a conical spring 28 biased between cam 20 and diverter plate 22 to continuously urge the sealing face 22b of the diverter plate 22 into sealing contact with the planar side portion of body 14. Connecting nipples 23, 24 and 25 are provided on body 14 for communicating with the various pneumatic devices as set forth in conjunction with FIGURE 1.

FIGURE 3 is a view taken along lines III—III of FIGURE 2 and shows the general configuration of the cam of the vacuum regulator and its extreme operative positions. Vacuum regulator body 14 has extending side members at the outer peripheries which serve as snap mounting means 14e. The side members of body 14 are planar and extend generally perpendicular to the cam 20. The cam 20, which is somewhat spoon-shaped, has a top working edge 22a, with a high and low point as shown. As will be explained hereinafter in conjunction with FIGURES 4 through 5A, the high point of top edge 22a provides the maximum heating position by interconnecting vacuum source nipple 23 with a control device for the pneumatically actuated heat exchanger (or similar device) attached to nipple 25, which regulates fluid flow through a heat exchanger (i.e., the vacuum provided regulates the control means for the heat exchanger). The low point of working edge 22a provides a minimum heat position by venting the nipple 25 to atmosphere and maintains the vacuum within the vacuum chamber of the body 14. The cam 20 has an elongated handle or lever portion 20b which is appropriately connected to temperature responsive means, such as automatic temperature sensing devices within the conditioned space or a manual indicator which can be set in the desired position corresponding with the desired temperature. The cam 20 operates through an arc (from pivotal point 14f) of approximately 45° and preferably 42°. As the cam moves through the arc, the working edge 22a engages calibrated shaft 19 and causes the same to move upwardly thereby increasing the tension in spring 18 (as best seen in FIGURES 2 and 4), which correspondingly moves the valve member 31 to regulate vacuum input to nipples 24 and 25, respectively. As will be appreciated, calibration shaft 19 may be adjusted to extend more or less through the top plate 11 thereby providing a greater range of temperature values over which the cam 20 will adjust the vacuum regulator. Thus the smaller or finer movement of cam 20 cause a greater movement of upper plate 11.

FIGURE 4 illustrates a somewhat modified form of vacuum regulator 20 having a raised top plate 11 which is substantially similar to elongated flat top plate 11 described in conjunction with FIGURE 1. The upwardly raised plate 11 provides a somewhat more rigid member useful in certain applications wherein more turbulent conditions are encountered. The vacuum regulator body 14 may be formed in one piece, as from moldable plastic material or other suitable material, and is generally cylindrically shaped, having a central body cavity 14a, a portion of which forms a vacuum chamber 14c defined by the walls of the cavity 14 and an outer flange 14b.

The body 14 also has an upper portion or lip 14d to which is attached, by suitable means 15, such as a rivet, the upwardly curved top plate 11 which has a centralized slot 12 and upwardly extending tensioned tabs 13 receiving a bar member 17. Top plate 11 has a frictionless pivotal area 15a allowing the main portion of top plate 11 to move up and down in relation to body 14. Bar member 17 is centrally attached to one end of a coil spring 18, the other end of which is attached to an upwardly extending hollow finger 26.

Finger 26 is in the general shape of an inverted T having a hollow main stem, which is somewhat tapered at the inner end to form a first valve seat 32. The arms of inverted T-shaped finger 26 turn upwardly to form an annular groove accommodating inner bead 30a of a flexible diaphragm 30. The inner bead 30a is held in sealing relationship with finger 26 by a portion of a spider means 16. The outer peripheral edge of diaphragm 30 forms a second bead 30b which is fitted into a groove formed in body 14 by the outer flange 14b of vacuum chamber 14c and the body cavity 14a. The bead 30b is held in sealing relationship with outer flange 14b by a second portion of the spider means 16. The flexible diaphragm 30, which may be of rubber, or other elastomeric material, thus seals vacuum chamber 14c from the body cavity 14a and defines a movable wall within the vacuum chamber 14c.

Extending through the hollow stem of finger 26 and in freely movable relationship therewith is a valve body 31 having opposed dual valve heads 31a and 31b, respectively. The first valve head 31a forms a valve seal with the first valve seat 32 within the hollow stem of finger 26 and vents vacuum chamber 14c to atmosphere. The second valve head 31b forms a valve seal with a second valve seat 33 centrally disposed at the bottom of vacuum chamber 14c and modulates vacuum from source nipple 23 to actuator nipple 24. Extending sidewise of valve body 31 and rigidly attached thereto are retaining arms 31c which support the bottom of spring means 34. Spring means 34 is biased between retaining arms 31c and the base of the inverted T-shaped finger 26 to continuously urge the valve heads 31a and 31b into sealing relationship with their respective valve seats.

Communicating directly with vacuum chamber 14c is a pneumatic actuator nipple 24 which is connected to an actuator (not shown) controlling the setting of a damper in a blend-air system. The vacuum chamber 14c is frustum-conically shaped, having a diminishing cross-section extending downwardly and terminating in a conical central opening. The tapered edges of the conical central opening form a second valve seat 33. It will be noted that the surfaces of valve seat 33 are tapered so as to be mating with valve head 31b, thereby forming a modulating valve. In direct communication with the central opening of vacuum chamber 14c is a central bore 23a, which is shown extending substantially the length of body 14 from the base thereof up to vacuum chamber 14c (although the length of bore 23a below nipple 23 is optional). Source vacuum nipple 23 communicates directly with central bore 23a and with a radial side passageway 23b which opens to a diverter plate 22. Source vacuum nipple 23 is substantially at a right angle to the side passageway 23b.

Surrounding central bore 23a, but without communicating with it, there is provided an annular chamber 25a within body 14 which communicates with a second actuator nipple 25. The annular chamber 25a is disposed at the lower base portion of the body 14. The annular chamber 25a is provided with a radial side passageway 25b opening to diverter plate 22 so as to selectively communicate with radial passageway 23b in accordance with the rotational position of diverter plate 22, as will be explained more fully in conjunction with FIGURES 5 and 5A. Central bore 23a is sealed at the base of body 14 by means of an appropriate air tight gasket member 35 which is held in place by spider means 36.

In the operation of vacuum regulator 10, it will be seen that when cam 20 is arcuately moved in a direction thereby causing calibrated shaft 19 to move upwardly or downwardly in response to the cam movement, there is a mechanical force applied to valve member 31 via spring 18 to open vacuum chamber 14c to the vacuum source nipple 23. The shaft 19 may, of course, be vertically adjusted to increase the range of temperature response of top plate 11 to the movement of cam 20. When a minimum amount of heat is called for by an appropriate temperature sensing means (not shown), which arcuately moves the cam 20 perpendicularly to the plane of the illustration and in a downward direction. As the cam 20 moves, the high point of the working edge 20a thereof causes shaft 19 to move upwardly. Shaft 19 is rigidly attached to plate 11, which pivots at frictionless pivot point 15a and moves with shaft 19 to move spring 18 and attached finger 26 upwardly. As the finger 26 moves upwardly, it lifts valve body 31, thereby opening valve seat 33. As previously pointed out, valve seat 33 has tapered surfaces mating with the tapered surfaces of the first valve head 31b so as to serve as a modulating valve rather than a simple on-off valve. As valve seat 33 is opened, source vacuum, via nipple 23 is bled into vacuum chamber 14c in a dynamic attempt to balance the mechanical force of spring 18, with a portion of the vacuum going to actuator nipple 24 (which is connected to an actuator regulating the position of a damper to reduce the amount of air by-passing a heat exchanger). When a balance of forces is achieved, with the aid of biased spring 34, the valve head 31b again seals valve seat 33. As best seen in FIGURE 5A, when the cam 20 moves so that the high point of working edge 20a pushes against shaft 19, the diverter plate 22 rotates a distance to bring a first port area 23c in communication with lower radial passageway 25b of actuator nipple 25, thereby applying vacuum to a pneumatically controlled heat exchanger to decrease the amount of fluid by-passing such heat exchanger and further reducing the temperature within the conditioned space. In reversed operation, when a maximum amount of heat is called for, shaft 19 seeks to maintain contact with the lower point of working edge 20a as the cam 20 is moved in an opposite direction to that previously described, thereby allowing plate 11 to move downwardly, pushing spring 18 against finger 26 to compress spring 34 and venting chamber 14c to atmosphere at valve seat 32. Actuator nipple 24 is also vented to atmosphere during the aforesaid venting of chamber 14c and the connected actuator responds by positioning the damper within the blend-air system to cause a maximum amount of air to by-pass the heat exchanger. Further, as the cam is thus rotated, the diverter plate 22 correspondingly rotates so that the first port area 23c no longer communicates with radial passageway 25b. Radial passageway 25b now communicates with atmosphere via second port area 25c, allowing the connected pneumatically regulated heat exchanger to increase the flow of fluid through the heat exchanger, thereby increasing the temperature within the conditioned space.

Referring now to FIGURE 5, a plan view taken substantially along the lines V—V as shown in FIGURE 4 discloses the respective areas of the first port 23c and second port 25c. These cross-sectional areas are preferred, however, it will be understood that other cross-sectional areas functioning in a similar manner may be employed.

FIGURE 5A illustrates, in phantom, the relationship between the ports 23c and 25c with the radial passageway 23b and 25b, respectively. Thus, in the position shown, radial passageway 23b (communicating with vacuum source nipple 23) is fully sealed by the diverter plate sealing face 22b but radial passageway 25b (communicating with lower actuator nipple 25) is vented to atmosphere via second port 25c. As the diverter plate is moved clockwise, first port 23c provides a communication between passageway 23b and passageway 25b.

FIGURE 6 illustrates the graphical relationship between the amount of vacuum necessary to balance the mechanical forces of cam movement. As illustrated, this is a substantially linear relationship allowing accurate regulation of the temperature within the conditioned space by controlled application of mechanical force to the cam.

It will be observed that a vacuum regulator valve having two functions has been provided in accordance with the objects of the invention. The first function is to modulate vacuum to a pneumatic actuator in reference to a mechanical force and the second function is to provide vacuum in an on-off manner to a pneumatically regulated heat exchange device so that both functions act in a co-ordinated manner to regulate temperature in a conditioned space.

It will be understood that the embodiments of the present invention have been used for illustrative purposes only and that various modifications and variations in the instant invention may be effected without departing from the spirit and scope of the novel concepts thereof.

I claim as my invention:

1. A vacuum control valve comprising a valve body having a vacuum inlet, a plurality of vacuum outlets, a plurality of vent ports and a passageway communicating with said inlet, at least one of said outlets and at least one of said vent ports; the inlet and outlets being associated with individual vent ports; valve means operatively disposed within the passageway for selectively opening at least one of the outlets to the inlet; a mechanical force transmitting device operatively connected with the valve means for moving the valve means in response to the force applied; said mechanical device being movable to a preselected position corresponding to a desired temperature range; and a movable diverter device connected with said mechanical device selectively communicating the vent port associated with the inlet with the vent port associated with an outlet.

2. A vacuum control valve as defined in claim 1 wherein the mechanical force transmitting device has an adjustment means varying the temperature range over which said control valve operates.

3. A vacuum control device as defined in claim 1 wherein the valve means includes two substantially opposed high capacity valve heads cooperating with opposed portions of the passageway, one of said valve heads venting to atmosphere and the other modulating vacuum to an outlet.

4. A vacuum control device as defined in claim 3 wherein the opposed valve heads are provided with biasing means continuously urging the valve heads into sealing relationship with the passageway.

5. A vacuum control valve as defined in claim 1 wherein the mechanical force transmitting device includes means defining a substantially frictionless pivot.

6. A vacuum control device as defined in claim 1 wherein the diverter device is provided with a spring means continuously urging the diverter device in working relationship with the vent ports associated with the inlet and outlet.

7. A vacuum control device as defined in claim 1 wherein the mechanical force transmitting device includes a two-component system, one of the components being an arcuately movable cam member and the other component being a substantially frictionless pivoted plate member contacting the cam member and being attached to the valve means.

8. A vacuum control device as defined in claim 1 wherein the inlet is disposed intermediate the outlets, the passageway is disposed in communication with the inlet, an outlet and a vent port and the vent ports are disposed in operative relationship with the inlet and another outlet from that in the vicinity of the passageway.

9. A vacuum control device as defined in claim 1 wherein one of the outlets is closed to the passageway, said outlet communicates via a vent port with the inlet.

10. A vacuum control device as defined in claim 1 wherein the passageway comprises a large opening having a relatively smaller tapered connecting port, said smaller tapered port being in communication with the inlet.

11. A vacuum control device as defined in claim 10 wherein the large opening of the passageway comprises a vacuum chamber having a flexible wall, said vacuum chamber communicating with an outlet.

12. The combination, with an automobile having an internal combustion engine with an intake manifold, a blend-air system having a damper and a heat exchanger, of a temperture control system for controlling the temperature of air within the automobile comprising; a vacuum-powered servo unit comprising a passageway having a first conduit means for connection to the intake manifold of the engine, a second conduit means for connection to a first pneumatic actuator regulating the setting of the damper in the blend-air system, a third conduit means for connection to a second pneumatic actuator regulating the flow of fluid through the heat exchanger, and an adjustable valve means in said passageway for varying the vacuum applied to the second and third conduit means.

13. The combination as defined in claim 12 including a temperature responsive valve control connected to and controlling the setting of the adjustable valve means as a function of the temperature within the blend-air system.

14. A vacuum regulator comprising means defining a vacuum chamber, said chamber having a wall composed of a flexible diaphragm and a first passageway communicating with a vacuum source, said first passage having a port communicating with atmosphere, a valve means having a first and second valve head in opposed relationship, a finger means sealably attached to said diaphragm defining a first valve seat for seating the first valve head of said valve means, said finger means being movable with said diaphragm and having venting means communicating with atmosphere, said first passageway having tapered side walls defining a second valve seat for seating the opposed valve head of said valve means, a top plate having one end attached to a peripheral edge of said vacuum chamber with the other end of said top plate being free, a tensioning means attached between said top plate and said finger means urging one toward the other, an adjustment means mounted through the free end of said top plate and rigidly attached thereto, a cam means pivotally attached to said vacuum chamber contacting said adjustment means, a second passageway within the vacuum chamber communicating with an actuator, an annular chamber adjacent said vacuum chamber communicating with atmosphere and communicating with an actuator, and a diverter means selectively connecting the port of said first passageway to said annular chamber.

References Cited

UNITED STATES PATENTS

| 1,939,916 | 12/1933 | Otto | 236—38 |
| 2,304,642 | 12/1942 | Hans. | |
| 2,668,014 | 2/1954 | Lund | 236—87 X |
| 3,319,888 | 5/1967 | Creager | 236—87 |

EDWARD J. MICHAEL, Primary Examiner

U.S. Cl. X.R.

91—412; 236—87